(12) United States Patent
Malik et al.

(10) Patent No.: US 7,313,597 B2
(45) Date of Patent: Dec. 25, 2007

(54) ALWAYS ACTIVE MESSAGE RETRIEVAL

(75) Inventors: Dale W. Malik, Dunwoody, GA (US); W. Todd Daniell, Marietta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 935 days.

(21) Appl. No.: 10/326,252

(22) Filed: Dec. 19, 2002

(65) Prior Publication Data

US 2004/0068546 A1    Apr. 8, 2004

Related U.S. Application Data

(60) Provisional application No. 60/427,629, filed on Nov. 19, 2002, provisional application No. 60/426,145, filed on Nov. 14, 2002, provisional application No. 60/416,916, filed on Oct. 8, 2002.

(51) Int. Cl.
*G06F 15/16*    (2006.01)

(52) U.S. Cl. ............... 709/206; 709/203; 715/733; 715/752

(58) Field of Classification Search ............... None
See application file for complete search history.

(56) References Cited

U.S. PATENT DOCUMENTS 6,195,564 B1*   2/2001   Rydbeck et al. ............ 455/557
2002/0099766 A1*   7/2002   Tuli ............................ 709/203

* cited by examiner

*Primary Examiner*—Yves Dalencourt
(74) *Attorney, Agent, or Firm*—Thomas, Kayden, Horstemeyer & Risley, LLP (57) ABSTRACT

Briefly described, one embodiment of a system for automatic electronic message retrieval, among others, includes a messaging client for receiving electronic messages and for authorizing automatic message retrieval, and an automatic messaging retrieval system configured to automatically check for electronic messages. Other systems and methods are also provided.

14 Claims, 7 Drawing Sheets

ALWAYS ACTIVE MESSAGE RETRIEVAL

CROSS-REFERENCE TO RELATED APPLICATIONS

This application claims priority to now abandoned U.S. provisional applications entitled, "FUNCTIONAL SPECIFICATION FOR E-MAIL CLIENT," having Ser. No. 60/416,916, filed Oct. 8, 2002, which is entirely incorporated herein by reference; "ALWAYS ACTIVE MESSAGE RETRIEVAL," having Ser. No. 60/426,145, filed Nov. 14, 2002, which is entirely incorporated herein by reference; and "ALWAYS ACTIVE MESSAGE RETRIEVAL," having Ser. No. 60/427,629, filed Nov. 19, 2002, which is entirely incorporated herein by reference.

TECHNICAL FIELD

The present invention is generally related to communications and, more particularly, is related to electronic mail.

BACKGROUND OF THE INVENTION

Electronic mail includes the transmission of electronic messages over a local area network and also the transmission of messages over the Internet. An electronic message may be simple text messages containing only ASCII, or it may be a complex message containing electronic files such as images, sounds, spreadsheets, etc. Electronic mail is commonly referred to as "email".

Typically, users receive email using some sort of email client. Many people use well-known stand alone clients like Microsoft Outlook, Outlook Express, Eudora, or a client provided by their Internet service provider (ISP). No matter what type of client, an email client generally does at least three things. First, the client shows a list of all the messages in a user's mailbox. Second, the client enables a user to read his or her email messages. Third, the client lets a user create new messages and send them.

Generally, a home user accesses his or her electronic mail in two ways: broadband services (such as DSL, cable modems, and satellite Internet) or dial-up access. With broadband services, the computer is continuously connected to the Internet. In contrast, for dial-up access, a computer connects to the Internet with a temporary connection, generally over a telephone line using a modem. A great many Internet service providers (ISPs) provide to its customers broadband services and dial-up access to the Internet for a modest fee.

To receive and send mail, generally, an email client communicates with an email server via the Internet. Through this communication, a user generally checks his or her email several times a day. Accordingly, due to common usage patterns amongst users, there are certain peak times of the day, such as early morning and early evening (when people get home from work and connect to retrieve their emails) when an email server receives an abundance of email requests. During these peaks, a great strain is put on the email server to fulfill a large number of requests. Thus, a heretofore unaddressed need exists in the industry to address the aforementioned deficiencies and inadequacies.

SUMMARY OF THE INVENTION

Preferred embodiments of the present invention provide systems and methods for automatic electronic message retrieval. Briefly described one embodiment of the system, among others, includes a messaging client for receiving electronic messages and for authorizing automatic message retrieval and an automatic messaging retrieval system configured to automatically check for electronic messages.

The preferred embodiments of the present invention can also be viewed as providing a method for automatically checking electronic messages. In this regard, one embodiment of such a method, among others, can be broadly summarized by the following steps: authorizing the automatic checking of electronic messages; and automatically checking for electronic messages.

Other systems, methods, features, and advantages of the present invention will be or become apparent to one with skill in the art upon examination of the following drawings and detailed description. It is intended that all such additional systems, methods, features, and advantages be included within this description, and the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

One preferred embodiment of an automatic messaging retrieval system of the present invention can be implemented in software, firmware, hardware, or a combination thereof. Preferably, the automatic messaging retrieval system is implemented in software, as an executable program in combination with other program modules, and is executed as part of an email client by a special or general purpose digital computer, such as a personal computer, workstation, minicomputer, or mainframe computer. An example of a general purpose computer that can implement the automatic messaging retrieval system 101 of the preferred embodiment of the present invention is shown in FIG. 1.

Figure 1:
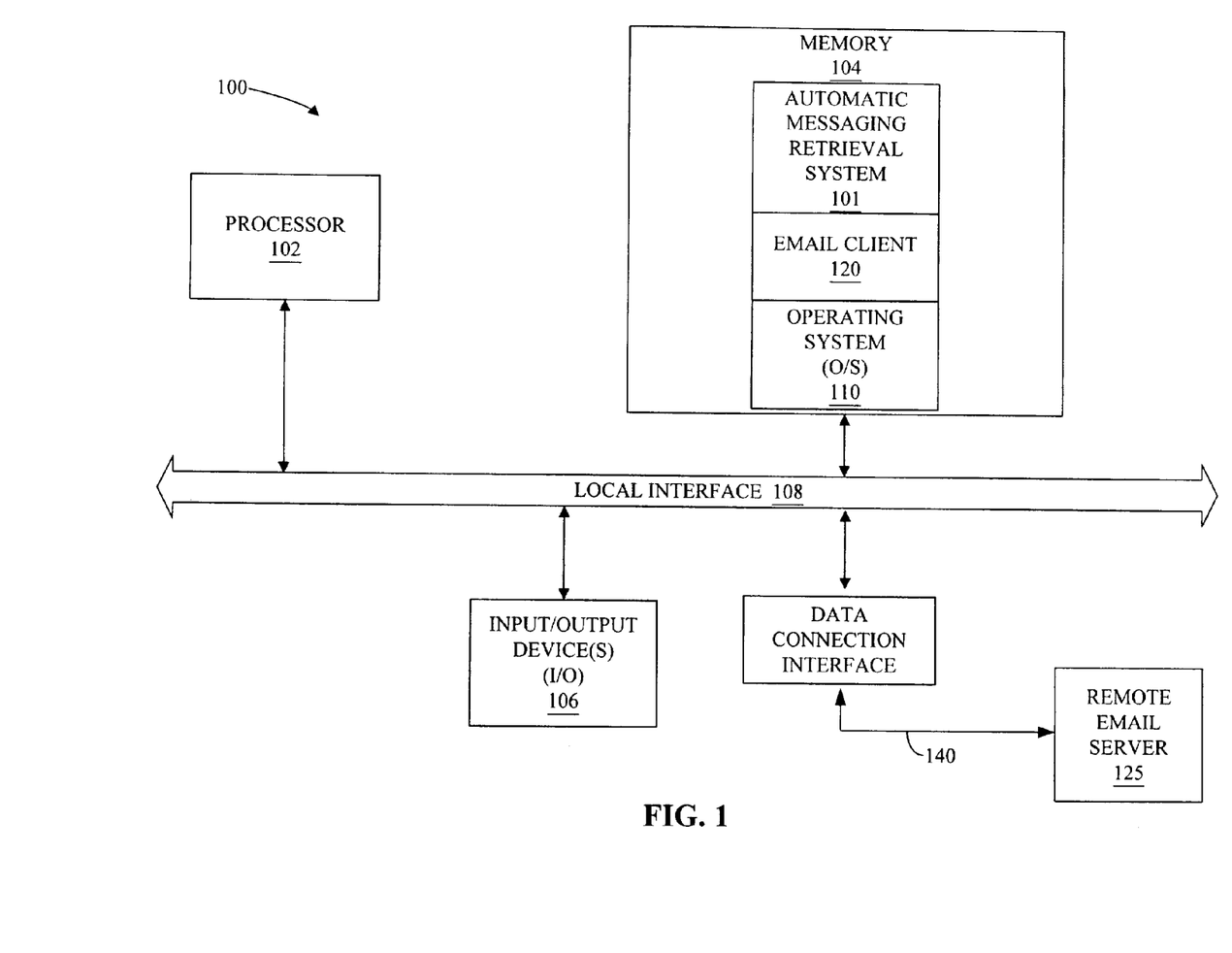
FIG. 1 is a block diagram of a computer than can implement the automatic messaging retrieval system of one preferred embodiment of the present invention.

Generally, in terms of hardware architecture, as shown in FIG. 1, the computer 100 includes a processor 102, memory 104, and one or more input and/or output (I/O) devices 106 (or peripherals) that are communicatively coupled via a local interface 108. The local interface 108 can be, for example but not limited to, one or more buses or other wired or wireless connections 140, as is known in the art. Further, the local interface 108 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 102 may be a hardware device for executing software that can be stored memory 104. The processor 102 can be any custom made or commercially available processor, a central processing unit (CPU) or auxiliary processor among several processors associated with a computer 100, and a semiconductor based microprocessor (in the form of a microchip) or a macroprocessor.

The memory 104 can include any one or combination of volatile memory elements (e.g., random access memory (RAM, such as DRAM, SRAM, etc.)) and nonvolatile memory elements (e.g., ROM, hard drive tape, CDROM, etc.). Moreover, the memory 104 may incorporate electronic, magnetic, optical, and/or other types of storage media. Note that the memory 104 can have a distributed architecture, where various components are situated remote from one another, but can be accessed by the processor 102.

The software in memory 104 may include one or more separate programs each of which comprises an ordered listing of executable instructions for implementing logical functions. In the example of FIG. 1, the software in memory 104 includes the automatic messaging retrieval system 101, email client 120, and an operating system (O/S) 110. The operating system 110 essentially controls the execution of other computer programs, and provides scheduling, input-output control, file and data management, memory management, and communication control and related services. The email client 120 facilitates the transmission and reception of electronic messages, such as email and instant messaging, for example.

The automatic messaging retrieval system 101 may be a source program, executable program (object code), script, or any entity comprising a set of instructions to be performed. If the automatic messaging retrieval system 101 is a source program, then the program needs to be translated via a compiler, assembler, interpreter, or the like, which may or may not be included within the memory 104, so as to operate properly in connection with the O/S 110. Furthermore, the automatic messaging retrieval system 101 can be written as (a) an object oriented programming language, which has classes of data and methods, or (b) a procedure programming language, which has routines, subroutines, and/or functions, for example but not limited to, C, C++, Pascal, Basic, Fortran, Cobal, Perl, Java, and Ada.

The I/O devices 106 may include input devices, for example but not limited to, a keyboard, mouse, scanner, digital camera, multi-function device, microphone, etc. Furthermore, the I/O devices 106 may also include output devices, for example but not limited to, a printer, display, etc. Finally, the I/O devices 106 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 100 is a PC, workstation, or the like, the software in the memory 104 may further include a basic input output system (BIOS) (omitted for simplicity). The BIOS is a set of essential software routines that initialize and test hardware at startup, start the O/S 110, and support the transfer of data among the hardware devices. The BIOS is stored in ROM so that the BIOS can be executed when the computer 100 is activated.

When the computer 100 is in operation, the processor 102 is configured to execute software stored within the memory 104, to communicate data to and from the memory 104, and to generally control operations of the computer 100 pursuant to the software. The automatic messaging retrieval system 101, the email client 120, and the O/S 110, in whole or in part, but typically the latter, are read by the processor 102, perhaps buffered within the processor 102, and then executed.

The computer 100 may operate in a networked environment using logical connections to one or more remote computers, such as a remote email server 125. Typically, the remote email server 125 includes many or all of the elements described relative to the computer 100. The data channel 140 depicted in FIG. 1 may include a broadband connection via a DSL line or a dial-up connection via a telephone line, among other acceptable examples of connection types. Such networking environments are commonplace in homes and small offices. Of course, the data channel 140 can include intermediate servers and other elements as well, and the remote email server 125 is typically part of a network, such as the Internet, among others.

When the automatic messaging retrieval system 101 and email client 120 are implemented in software, as is shown in FIG. 1, it should be noted that the automatic messaging retrieval system 101 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The automatic messaging retrieval system 101 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the automatic messaging retrieval system 101 is implemented in hardware, the automatic messaging retrieval system 101 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
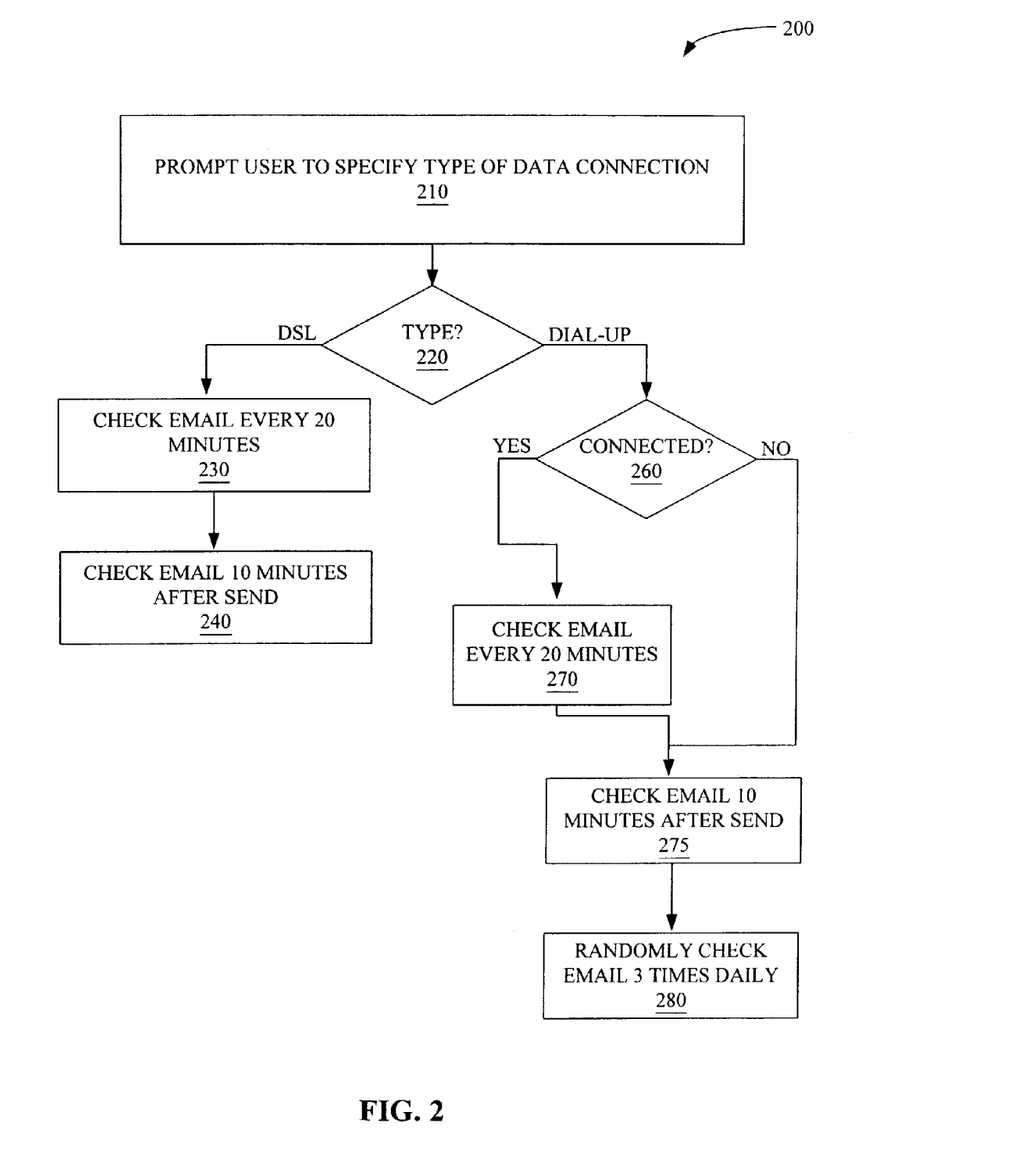
FIG. 2 is a flowchart illustrating the functionality of a representative embodiment of the automatic messaging retrieval system of FIG. 1.

The flowchart of FIG. 2 shows the functionality of a representative implementation of the automatic messaging retrieval system 101 of one preferred embodiment of the present invention. It should also be noted that in some alternative implementations the functions noted in the various blocks may occur out of the order depicted in the flowcharts of FIG. 2 and subsequent flowcharts. For example, two blocks shown in succession in a flowchart may, in fact, be executed substantially concurrently. Alternatively, the blocks may sometimes be executed in the reverse order depending upon the functionality involved.

As depicted in FIG. 2, the functionality of a representative embodiment of the automatic messaging retrieval system 101 or method 200 for automatically checking emails may be construed as beginning at block 210. Note, in addition to this checking process (and any other process described), the user still can manually check his or her email. Also, each checking process described in FIG. 2 is preferably performed independently of any other checking process that may occur.

In block 210, a user is prompted to specify whether the user has a broadband connection to the Internet or a dial-up connection. This step (and many subsequent ones) may be facilitated by utilizing a graphical user interface (GUI). Depending upon the user's response, as shown in block 220, different steps are going to be performed. If the user has broadband access, such as a DSL connection, the user's email is checked every 20 minutes (or some other specified amount of time), as depicted in block 230. Further, as shown in block 240, the user's email will be checked 10 minutes (or some other stated delay) after a user sends an email.

Alternatively, if the user has a dial-up service, a user's email will be checked every 20 minutes (or some other stated time) as long as the user is connected to the Internet, as shown in blocks 260-270. If the user is not connected to the Internet, then the user's email will not be checked as part of this step.

Commonly, dial-up Internet connections with analog and/or digital (POTS and/or ISDN) access lines are used to establish circuit-switched connections through the PSTN (Public Switched Telephone Network). Then connection-oriented layer two protocols such as SLIP (Serial Line IP) and/or PPP (Point-to-Point Protocol) are used to establish a connection to network access servers (NAS) of ISPs. These connection-oriented layer two protocols encapsulate and transport layer three network level IP packets. Network devices, such as but not limited to personal computers, which contain SLIP or PPP protocol processes can determine whether connectivity has been established with the ISP based on whether the connection oriented layer two protocols have reached a connected state. One skilled in the art will be aware of many other connection-oriented protocols, such as but not limited to X.25, frame relay, and ATM, that provide connection-oriented virtual circuits whose establishment might indicate creation of a connection to the Internet.

Each time a user's email is checked, the user will be authenticated with the email server 125. Typically, one authorization approach, among others, involves the sending of the user's username and password to the email server 125 so that the email server 125 can verify that the user is authorized to receive email for a particular email address. After the user is authorized, then the email server 125 sends any undelivered email for the user to the user's email client 120.

In block 275, regardless of whether the user is connected to the Internet or not, the user's email will be checked 10 minutes (or some other stated time) after the user sends email. Accordingly, a dial-up connection to the Internet will be made if the user is not presently connected to the Internet. After the email is checked, the dial-up connection will be terminated.

As an added feature for users having dial-up service, email is checked three (or some other number of) times a day automatically, as shown in block 280. Therefore, a user may come home from work with all of his or her email already retrieved from a server which will alleviate much of the peak demands on an email server. Also, the automatic checking of email is a convenient feature for the customer receiving dial-up service. The different types of automatic checking of email are discussed further below.

Figure 3:
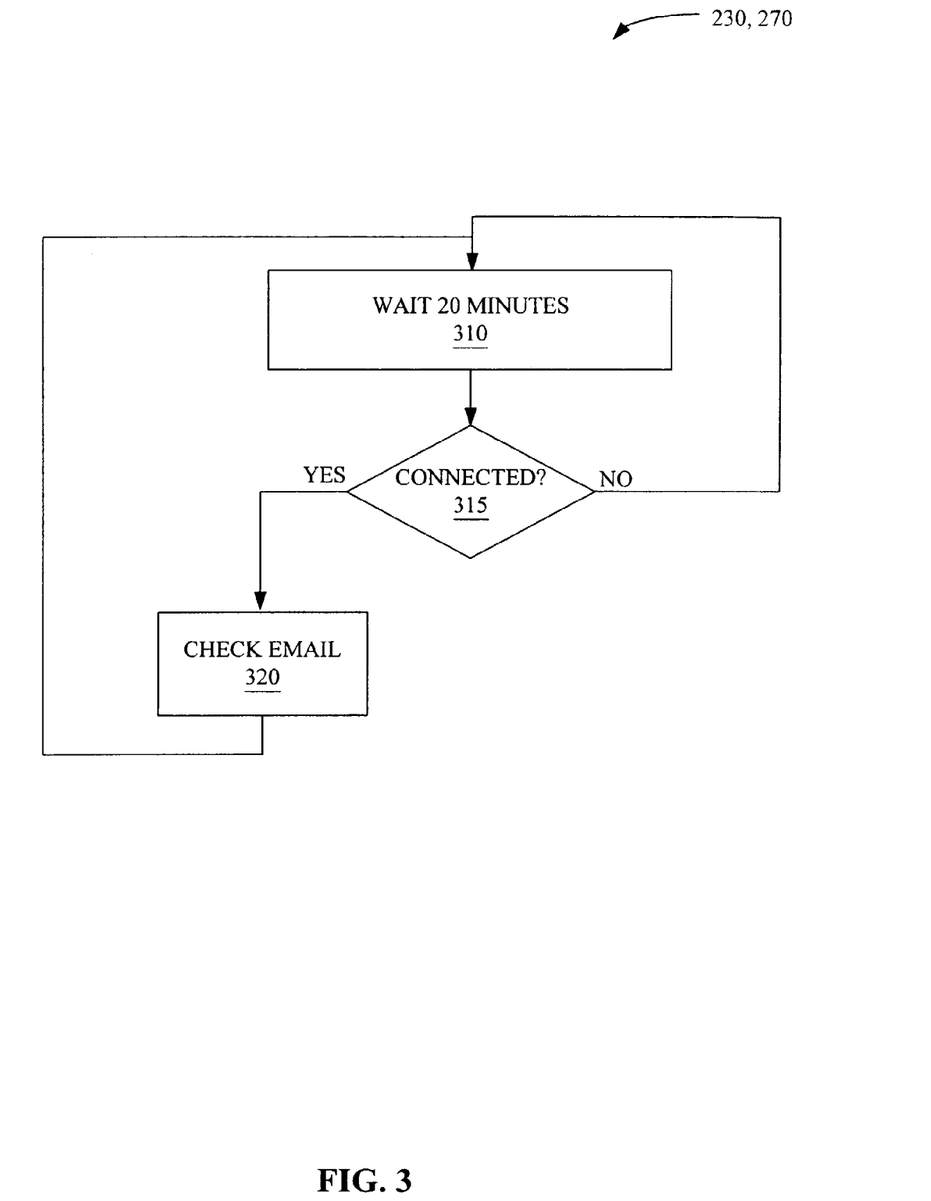
FIG. 3 is a flowchart illustrating the process of periodically checking for email messages after a certain amount of time as referenced in FIG. 2.

As depicted in blocks 230 and 270, email is periodically checked after a certain amount of time if the user is connected to the Internet. This process is shown in FIG. 3. In blocks 310-315, the Internet connection status is checked after an allotted amount of time, such as 20 minutes. If the user is connected to the Internet, then the user's email is checked with the email server that services the user, as depicted in block 320. If the user is not connected to the Internet, then the user's email is not checked. The process then continuously repeats itself as shown by step 330.

Figure 4:
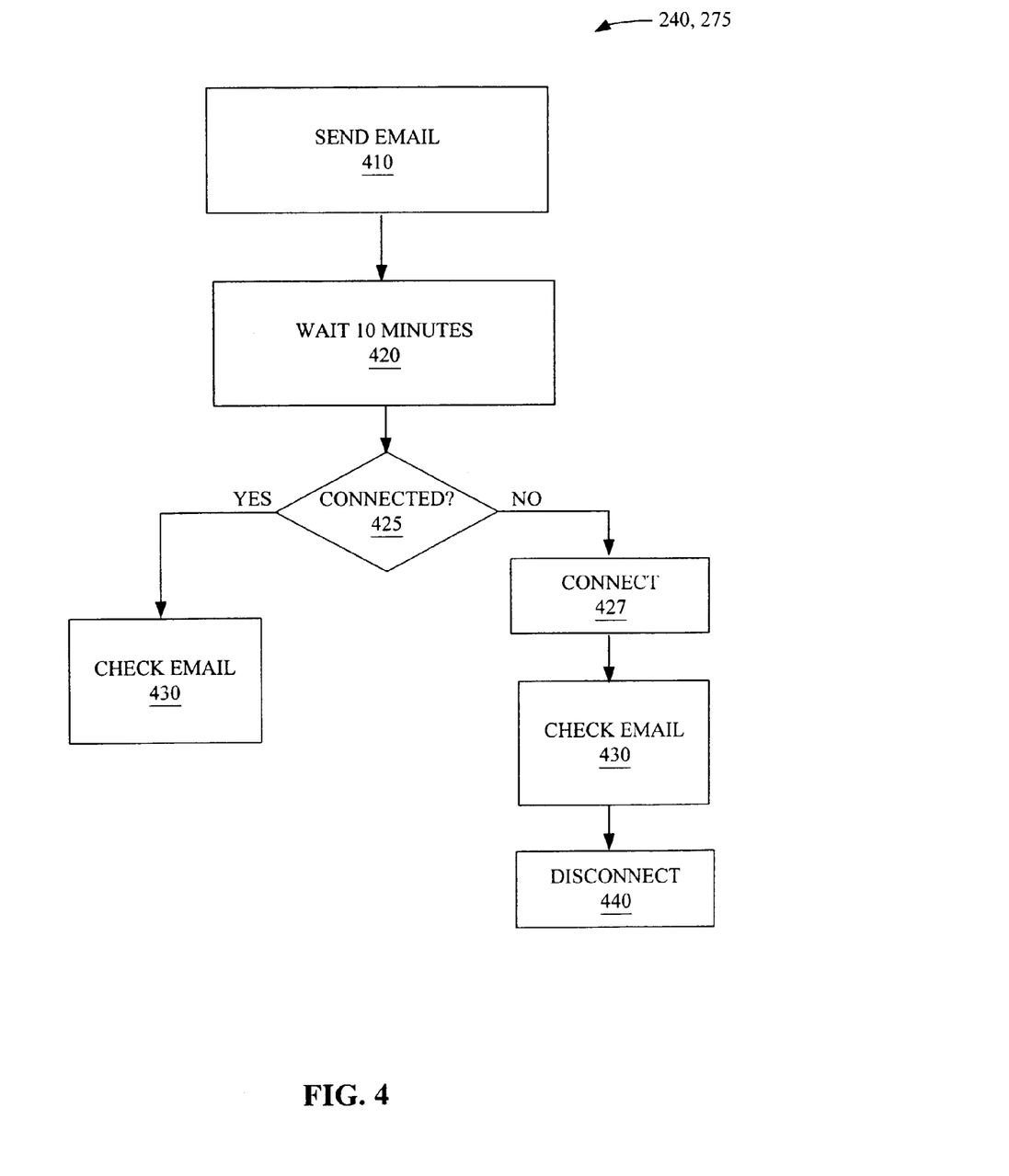
FIG. 4 is a flowchart illustrating the process of checking for email messages a set time after an email is sent as referenced in FIG. 2.

The checking process that occurs after an email is sent is shown below in FIG. 4. Accordingly, in block 410, an email is transmitted or sent by the email client 120 to the email server 125 via the Internet connection 140. After a set period of time after the email was sent, such as 10 minutes, as depicted in block 420, the email client checks to see if the user is currently connected to the Internet. If the user has a dial-up service and is not connected, as shown in blocks 425-427, the user is then automatically connected to the Internet. If a user is unable to be connected to the Internet, because a user's dial-up line is busy, typically, the email client will attempt to make a connection after a time delay, such as 5 minutes. The length of the delay may also be increased after subsequent failed connection attempts.

Once the user is connected to the Internet, a request is made for the email server 125 to check to see if the user has any email, such as a reply to the previous email that was sent, as shown in block 430. Note, only one check of the email is scheduled at a time after an email is sent. For example, two emails that are sent right after each other will only result in one check for email for this preferred embodiment of the invention. Advantageously, by checking a short time, but not right after, an email is sent, a reply to a user's message is more likely to be successfully retrieved by the user. Lastly, as shown in block 440, if the user was previously disconnected to the Internet before the email was checked, the user's Internet service is disconnected.

Figure 5:
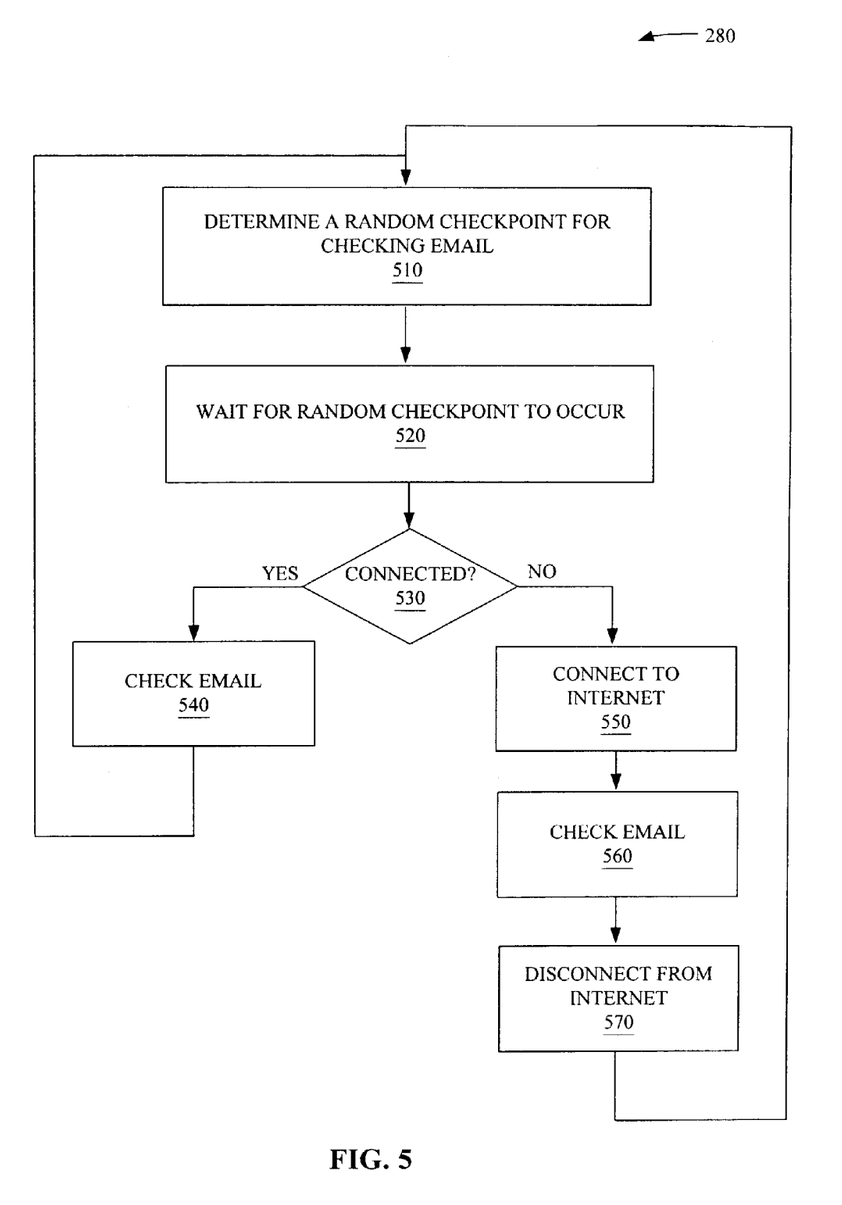
FIG. 5 is a flowchart illustrating the process of frequently checking for email messages for dial-up service users as referenced in FIG. 2.

Referring now to FIG. 5, as previously depicted in block 280, the process of frequently checking email for dial-up service customers is shown. Accordingly, in block 510, a random time to check for email is determined (i.e. random checkpoint). For example, the automatic retrieval system 101 may compute three times for checking the email of a user during a 24 hour period. Each of these times may be selected to occur during one of three windows of time, where the three windows of time occur in the morning, afternoon, and evening. Therefore, a random checkpoint can be selected from each of the three windows so that a user's email is checked three times a day during the morning, afternoon, and evening.

In addition, the times may be selected so that email requests are efficiently distributed. If most of the email requests for users that are serviced by an email server are evenly spread out during each individual window, then the email server will experience less peaks in emails service requests. To compute the random checkpoint for checking a user's email, the automatic messaging retrieval system may use a user's local system clock from his or her computer and a random number generator to generate a particular email checking point or time inside a window that assures with a high probability that the total requests for service to the email server during a window are evenly distributed.

For example, time windows or intervals for checking emails may be based on determining a random checkpoint (or time) during any minute within the first time window and then equally incrementing the time into subsequent windows. For example, if the first time window or interval is 180 minutes long and begins at 8 a.m., then a random checkpoint at the 78th minute would take place at 9:18 a.m. Therefore, if the second window or interval takes place from 11 a.m. to 2 p.m., then the next email checking point would take place at 12:18 and so on.

Determination of the random checkpoint may be done by taking the time window length and multiplying it by a random normalized number. This normalized number is found by taking the random number generation range and using it as the denominator and the resulting random number as the numerator to create a number between 0 and 1 which can be multiplied by the time window or interval length to select a particular starting email checking point or time (i.e. a random checkpoint).

Accordingly in block 510, a random checkpoint within a window for checking the user's email is determined. The random checkpoint for checking email for each window may be determined at the same time, or the random checkpoint values may be determined sequentially as they are needed. Next, in block 520, the automatic messaging retrieval system waits for the random checkpoint value to occur on the local system clock. After the random checkpoint occurs, the connection status is checked to see if the user is connected to the Internet, as shown in block 530. If the user is connected to the Internet, then the user's email is checked, as shown in block 540. If the user is not connected to the Internet, the user is connected to the Internet via the user's dial-up service, as shown in block 550. Then, in block 560, the user's email is checked. Afterwards, the user is disconnected from the Internet, as shown in block 580. Once a user's email is checked, the process is repeated as shown in step 580.

Figure 6:
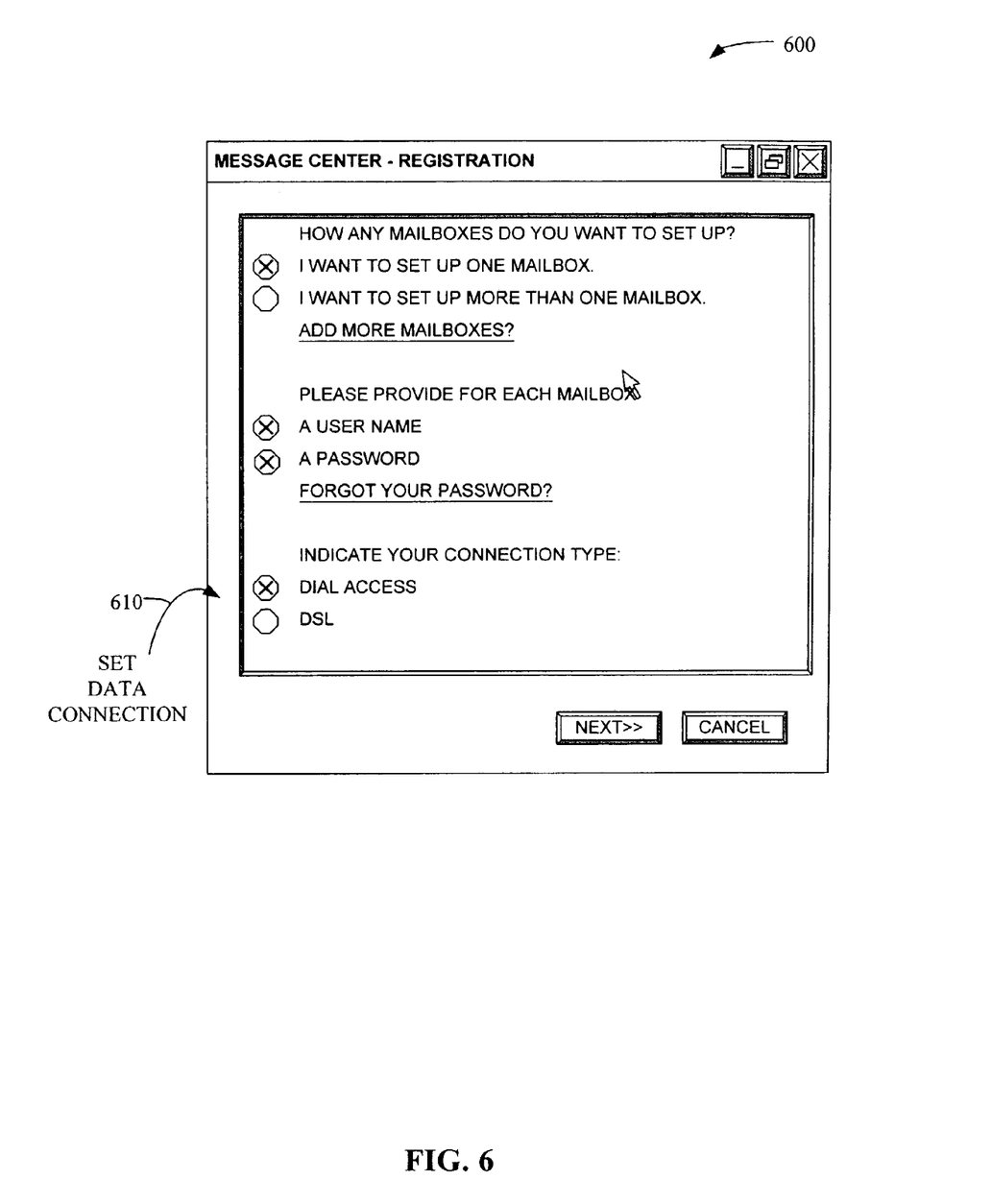
FIG. 6 is a pictorial representation of an interface for setting up the automatic messaging retrieval system of FIG. 1.
Figure 7:
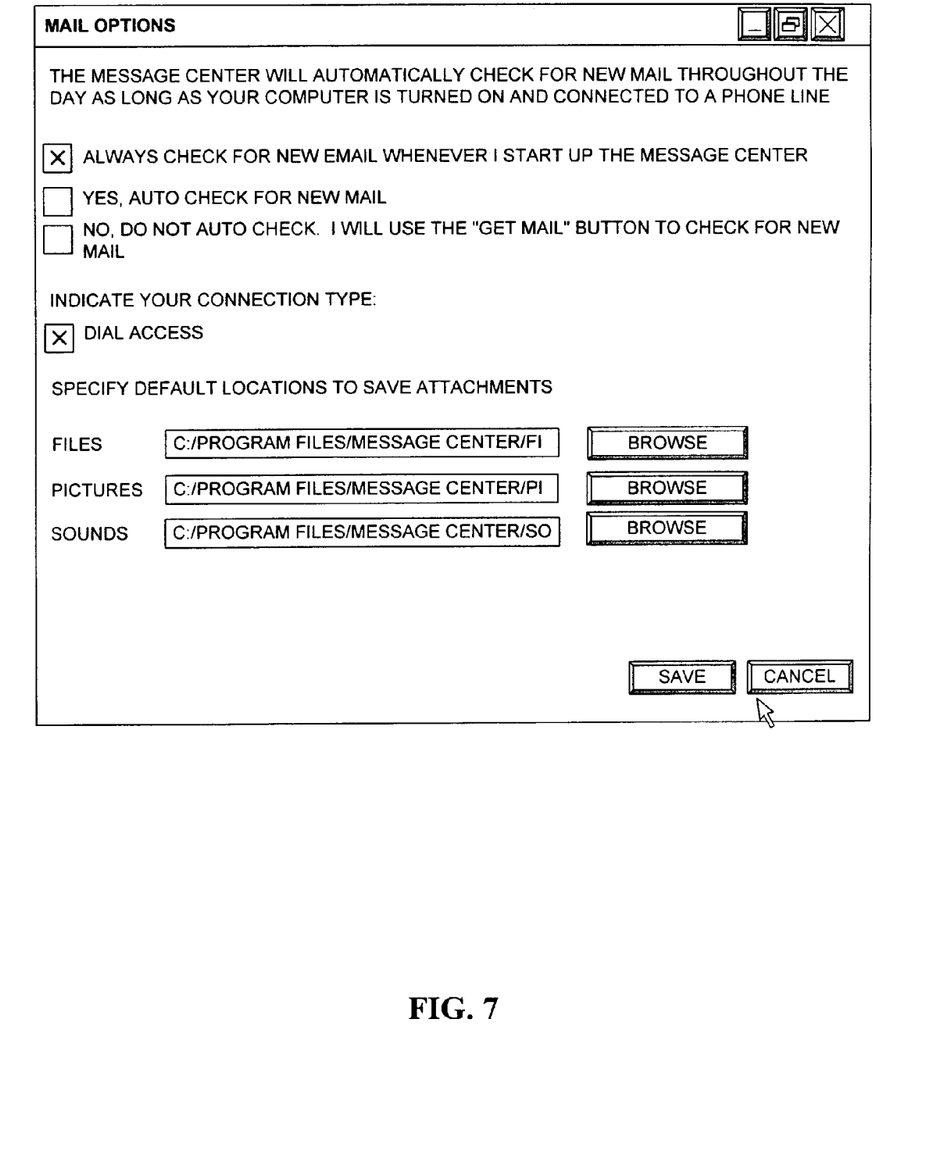
FIG. 7 is a pictorial representation of an inbox interface for one preferred embodiment of the automatic messaging retrieval system of FIG. 1.

As previously mentioned, the functionality of the automatic messaging retrieval system 101 may be facilitated by a graphical user interface (GUI). For example, one representative window interface 600 for setting up the automatic retrieval messaging system 101 is shown in FIG. 6. Here, a user may designate the type of data connection 610 that services the user. Correspondingly, in FIG. 7, an options window interface 700 is shown for one preferred embodiment of the invention for allowing a user to turn on the automatic checking processes 230, 340, 270, 275, 280 in the automatic messaging retrieval system 101. In addition, as shown in FIG. 7, it is contemplated that a user may choose to only check mail manually.

Advantageously, the above-described embodiments of the present invention, efficiently distributes the amount of email requests that an email server receives and responds to. In turn, email is automatically delivered to users. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. For example, in other preferred embodiments of the invention, the checkpoint may be a non-random value that is designated by the ISP or specified by a user. Alternatively, the user may be able to designated desired time window lengths. All such modifications and variations are intended to be included herein within the scope of this disclosure and the present invention and protected by the following claims.

Therefore, having thus described the invention, at least the following is claimed:

1. A method for automatic message retrieval, comprising:
   automatically checking for electronic messages according to a data connection type designated for a messaging client, the messaging client retrieving a new electronic message that is verified to be present as a result of the checking operation, wherein:
   if the messaging client is designated by a user to employ a continual connection to a data network, electronic messages are checked periodically by the messaging client and are checked a set period of time after an electronic message is sent from the messaging client;
   if the messaging client is designated by the user to employ a temporary connection to a data network, electronic messages are checked a discrete number of times during respectively defined windows of time by the messaging client and are checked a set period of time after an electronic message is sent from the messaging client;
   selecting a plurality of times for checking for electronic messages in the defined windows of time by randomly determining a time within a first window of time and then equally incrementing the time into subsequent windows of time to determine additional times for checking for electronic messages within the defined windows of time; and selecting a time for checking for electronic messages in one of the defined windows of time so that email requests to an email server from the user and other users may be efficiently distributed.

2. The method of claim 1, further comprising:
   prompting the user to specify a type of data connection employed by the messaging client.

3. The method of claim 1, wherein the temporary connection to a data network comprises a dial-up network connection.

4. The method of claim 1, further comprising:
   prompting the user to specify lengths for the defined windows of time.

5. The method of claim 1, further comprising:

connecting the messaging client designated as employing a temporary connection with the data network in order to check for electronic messages; and disconnecting the messaging client designated as employing a temporary connection from the data network after electronic messages are checked.

6. A system for automatic message retrieval, comprising:

a messaging system configured to:

automatically check for electronic messages according to a data connection type designated for the messaging system, the messaging client retrieving a new electronic message that is verified to be present by the checking operation, wherein:

if the messaging system is designated by a user to employ a continual connection to a data network, electronic messages are checked periodically by the messaging client and are checked a set period of time after an electronic message is sent from the messaging system;

if the messaging system is designated by the user to employ a temporary connection to a data network, electronic messages are checked a discrete number of times during respectively defined windows of time by the messaciinci client and are checked a set period of time after an electronic message is sent from the messaging system;

select a plurality of times for checking for electronic messages in the defined windows of time by randomly determining a time within a first window of time and then equally incrementing the time into subsequent windows of time to determine additional times for checking for electronic messages within the defined windows of time; and select a time for checking for electronic messages in one of the defined windows of time so that email requests to an email server from the user and other users may be efficiently distributed.

7. The system of claim 6, the messaging system further configured to prompt the user to specify a type of data connection employed by the messaging system.

8. The system of claim 6, wherein the temporary connection to a data network comprises a dial-up network connection.

9. The system of claim 6, the messaging system further configured to prompt the user to specify lengths for the defined windows of time.

10. A computer readable medium having a computer program for automatic message retrieval, the computer readable medium having instructions stored thereon and when the instructions are executed by a processor, the instructions cause the processor to perform:

automatically checking for electronic messages according to a data connection type designated for a messaging client, the messaging client retrieving a new electronic message that is verified to be present as a result of the checking operation wherein:

if the messaging client is designated by a user to employ a continual connection to a data network, electronic messages are checked periodically by the messaging client and are checked a set period of time after an electronic message is sent from the messaging client;

if the messaging client is designated by the user to employ a temporary connection to a data network, electronic messages are checked a discrete number of times during respectively defined windows of time by the messaging client and are checked a set period of time after an electronic message is sent from the messaging client;

selecting a time for checking for electronic messages in one of the defined windows of time so that email requests to an email server from the user and other users may be efficiently distributed; and selecting a plurality of times for checking for electronic messages in the defined windows of time by randomly determining a time within a first window of time and then equally incrementing the time into subsequent windows of time to determine additional times for checking for electronic messages within the defined windows of time.

11. The computer readable medium of claim 10, the program further performing:

prompting the user to specify a type of data connection employed by the messaging client.

12. The computer readable medium of claim 10, wherein the temporary connection to a data network comprises a dial-up network connection.

13. The computer readable medium of claim 10, the program further performing:

prompting the user to specify lengths for the defined windows of time.

14. The computer readable medium of claim 10, the program further performing:

connecting the messaging client designated as employing a temporary connection with the data network in order to check for electronic messages; and disconnecting the messaging client designated as employing a temporary connection from the data network after electronic messages are checked.

* * * * *